United States Patent
Degraaff et al.

(10) Patent No.: US 6,679,757 B2
(45) Date of Patent: Jan. 20, 2004

(54) SHAPING TOOL AND METHOD FOR SHAPING CURVED SURFACES ON WORKPIECES

(75) Inventors: Willem Thomas Degraaff, Albuquerque, NM (US); Jae Yong Um, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 112 days.

(21) Appl. No.: 10/103,112

(22) Filed: Mar. 21, 2002

(65) Prior Publication Data

US 2003/0181140 A1 Sep. 25, 2003

(51) Int. Cl.[7] .............................................. B24B 23/00
(52) U.S. Cl. ........................... 451/28; 451/45; 451/356; 451/558; 76/82
(58) Field of Search ........................... 451/28, 45, 356, 451/555, 557, 558; 76/82

(56) References Cited

U.S. PATENT DOCUMENTS

| | | | |
|---|---|---|---|
| 3,813,830 A | 6/1974 | Hodge | 51/392 |
| 3,956,856 A | * 5/1976 | Yonkers | 451/164 |
| 4,512,111 A | 4/1985 | Childers | 51/157 |
| 4,589,175 A | 5/1986 | Arrigoni | 29/156.8 |
| 4,630,409 A | 12/1986 | Hofstetter | 51/361 |
| 4,653,232 A | 3/1987 | Foreman | 51/46 |
| 5,001,869 A | * 3/1991 | Hutchins | 451/356 |
| 5,140,778 A | 8/1992 | Carruth | 51/170 R |
| 5,140,784 A | 8/1992 | Walsh | 51/358 |
| 5,165,847 A | 11/1992 | Proctor et al. | 415/115 |
| 5,203,885 A | 4/1993 | Pastre et al. | 51/298 |
| 5,361,548 A | 11/1994 | Kuehn | 451/76 |
| 5,643,059 A | 7/1997 | Chen | 451/164 |
| 6,030,281 A | 2/2000 | Cozzini et al. | 451/320 |
| 6,186,867 B1 | 2/2001 | Dwyer | 451/28 |
| 6,220,948 B1 | 4/2001 | Carballo | 451/356 |
| 6,233,822 B1 | 5/2001 | Grossklaus et al. | 29/889.1 |
| 6,270,399 B2 | 8/2001 | Gunn | 451/557 |
| 6,287,182 B1 | 9/2001 | Dwyer | 451/365 |

* cited by examiner

Primary Examiner—Joseph J. Hail, III
Assistant Examiner—Anthony Ojini
(74) Attorney, Agent, or Firm—Vg Ramaswamy; Hasse Guttag & Nesbitt LLC; Eric W. Guttag

(57) ABSTRACT

A tool for shaping curved surfaces on a workpiece, in particular upper curved surfaces of the forward and aft rails of a gas turbine engine shroud section. The shaping tool includes a base member for securing the workpiece and a shaping member movable relative to the base member and having one shaping element for each curved surface of the workpiece. The shaping tool also includes cooperating follower and guide members to guide the shaping member through a path as the shaping member is moved relative to the base member such that each of the shaping elements of the shaping member shape the respective curved surfaces of the workpiece. The tool can be used in a method for shaping the curved surfaces of the workpiece where the shaping member is moved in a path such that each of the shaping elements of the shaping member shape the respective curved surfaces of the workpiece and repeating this step until the desired degree of shaping of the curved surfaces of the workpiece is achieved.

26 Claims, 8 Drawing Sheets

SHAPING TOOL AND METHOD FOR SHAPING CURVED SURFACES ON WORKPIECES

BACKGROUND OF THE INVENTION

The present invention relates generally to a tool for shaping curved surfaces on workpieces, and in particular the upper curved surfaces of the fore and aft rails of a gas turbine engine shroud section. The present invention further relates to a method for shaping these curved surfaces with this shaping tool.

The turbines and compressors of gas turbine engines such as jet engines each include one or more circumferentially extending rows or stages of rotating rotor blades which are axially spaced between rows or stages of fixed stator vanes. Each rotor blade has a blade root mounted to the rotor disk, and an airfoil extending radially outwardly from the root which terminates at a blade tip. In many gas turbine engine designs, a number of abutting, circumferentially extending shroud segments or sections are carried by the turbine or compressor case to form an essentially continuous cylindrical-shaped surface along which the tips of the rotor blades tangentially pass. Each of these shroud sections includes an outer face, and an inner, arcuate-shaped face along which the blade tips pass, opposite end portions which abut with adjacent shroud sections and opposed side mounting rails which mount to stationary hangers on the casing of the turbine and/or compressors.

A representative embodiment of one such shroud assembly 10 is disclosed in commonly assigned U.S. Pat. No. 5,165,847 (Proctor et al), issued Nov. 24, 1992. As shown in FIG. 1 of the Procter et al patent, shroud assembly 10 includes a shroud in the form of an annular array of arcuate shroud sections 22 which are held in position by an annular array of arcuate hanger sections 24 supported by the engine outer case 26. Each shroud section 22 is provided with an arcuate or curved base 44 having a radially outwardly extending fore rail 46 and a radially outwardly extending aft rail 48 that are connected by a pair of laterally spaced side rails 50. Shroud section fore rail 46 is provided with a forwardly extending flange 54 which overlaps a flange 56 rearwardly extending from hanger section fore rail 28. An underlying flange 60 rearwardly extending from shroud section aft rail 48 overlaps with hanger flange 58 that extends from hanger section aft rail 30. Flanges 58 and 60 are held in this overlapping relation by an annular C-shaped retaining ring 62. The upper flange 54 of fore rail 46 and upper flange 60 of aft rail 48 that extend between side rails 50 each have a convex arcuate or curved shape.

Shroud sections such as those shown in the Procter et al patent are often made from hard to machine nickel alloys and are typically turned or ground to generate the critical locating surfaces, such as the fore and aft rails. Because these shroud sections are exposed to elevated temperatures in an oxidizing atmosphere, they are often provided with environmental protection in the form of metallic coatings. Methods for applying such metallic coatings include depositing a vapor of one or more protective metals at high temperatures, for example aluminum or alloys of aluminum, to provide, for example, an aluminide coating on the shroud section.

A protective coating, such as an aluminide coating, is typically not required for the curved surfaces of the upper flanges of the fore and aft rails of the shroud section. However, it is usually not economically feasible to selectively mask these surfaces to prevent them from being coated during the coating process. Because of variations that exist in such coating methods, the coating thickness can also differ over the various portions of the shroud section. As a result, the coated shroud section can be become oversized.

In addition, the coating thickness on the curved surfaces of the upper flanges of the fore and aft rails can vary enough to alter the dimensional shape of these rails. Besides variations in coating thickness, the dimensional shape of the upper flanges of the fore and aft rails can become distorted as a result of the heat used in the coating process. While these variations in dimensional shape of the fore and aft rails are usually relatively minute, they can be enough to require reshaping so that the shroud sections can be connected to each other and to their appropriate hanger sections.

Reshaping of these oversized and/or distorted shroud sections typically requires the removal of relatively minute amounts of material (e.g., the coating, the underlying metal or both) from the curved surfaces of the upper flanges of the fore and aft rails. The amount of material required to be removed from these curved surfaces to achieve the desired reshaping is typically on the order of a fraction of a thousandth of an inch, i.e., a fraction of a mil. Conventional machining processes typically cannot remove such small amounts of material effectively. Grinding rework processes to remove such small amounts of material can also be expensive and tedious to set up.

Accordingly, it would be desirable to provide a relatively simple, inexpensive and easy to use tool and method for reshaping the upper curved surfaces of the fore and aft rails of a gas turbine engine shroud section that has become oversized, distorted or otherwise requires reshaping. It would also be desirable to provide a relatively simple, inexpensive and easy to use tool and method for shaping or reshaping the curved surfaces of other workpieces besides gas turbine engine shroud sections to a desired configuration.

BRIEF DESCRIPTION OF THE INVENTION

The present invention relates to a shaping tool for a workpiece having at least two laterally spaced curved surfaces. The shaping tool comprises:
  (a) a base member for securing the workpiece;
  (b) a shaping member movable relative to the base member and having one shaping element for each curved surface of the workpiece, each shaping element being laterally spaced and positioned relative to the respective curved surface to permit shaping of that curved surface as the shaping member is moved relative to the base member;
  (c) a guide member associated with one of the base member and the shaping member;
  (d) a follower member associated with the other of the base member and the shaping member;
  (e) the guide member and the follower member cooperating to guide the shaping member through a path as the shaping member is moved relative to the base member such that each of the shaping elements of the shaping member shape the respective curved surfaces of the workpiece.

The present invention also relates to a method for shaping the curved surfaces of the workpiece with this shaping tool. This method comprises the steps of:
  (a) securing the workpiece to the base member;
  (b) positioning the shaping member relative to the base member so that each shaping element of the shaping member is capable of shaping the respective curved surface of the workpiece;

(c) moving the shaping member in a path such that each of the shaping elements of the shaping member shape the respective curved surfaces of the workpiece; and (d) repeating step (c) until the desired degree of shaping of the curved surfaces of the workpiece is achieved.

The shaping tool of the present invention and method of using same provides a number of benefits in shaping workpieces that having a plurality of (i.e., at least two) laterally spaced curved surfaces. The shaping tool of the present invention is relatively simple, inexpensive and easy to use in effectively removing relatively small amounts of material (e.g., fractions of a mil) from curved surfaces of workpieces. It can be used to shape curved surfaces of workpieces made from a variety of materials and can be used to shape curved surfaces that lie in either the same or substantially the same curve plane, as well as curved surfaces that lie in different, latitudinally (i.e., vertically) spaced curve planes. The shaping tool and method of the present invention can also allow controlled removal of relatively small amounts of material from the curved surfaces of the workpiece such that the desired degree of shaping of the curved surfaces of the workpiece is automatically, reproducibly and repeatedly achieved.

DETAILED DESCRIPTION OF THE INVENTION

As used herein, the term "mil" is used in the conventional sense of referring to 0.001 in. (0.0254 mm).

As used herein, the term "comprising" means various components, elements, capabilities and/or steps can be conjointly employed in the present invention. Accordingly, the term "comprising" encompasses the more restrictive terms "consisting essentially of" and "consisting of."

Figure 1:
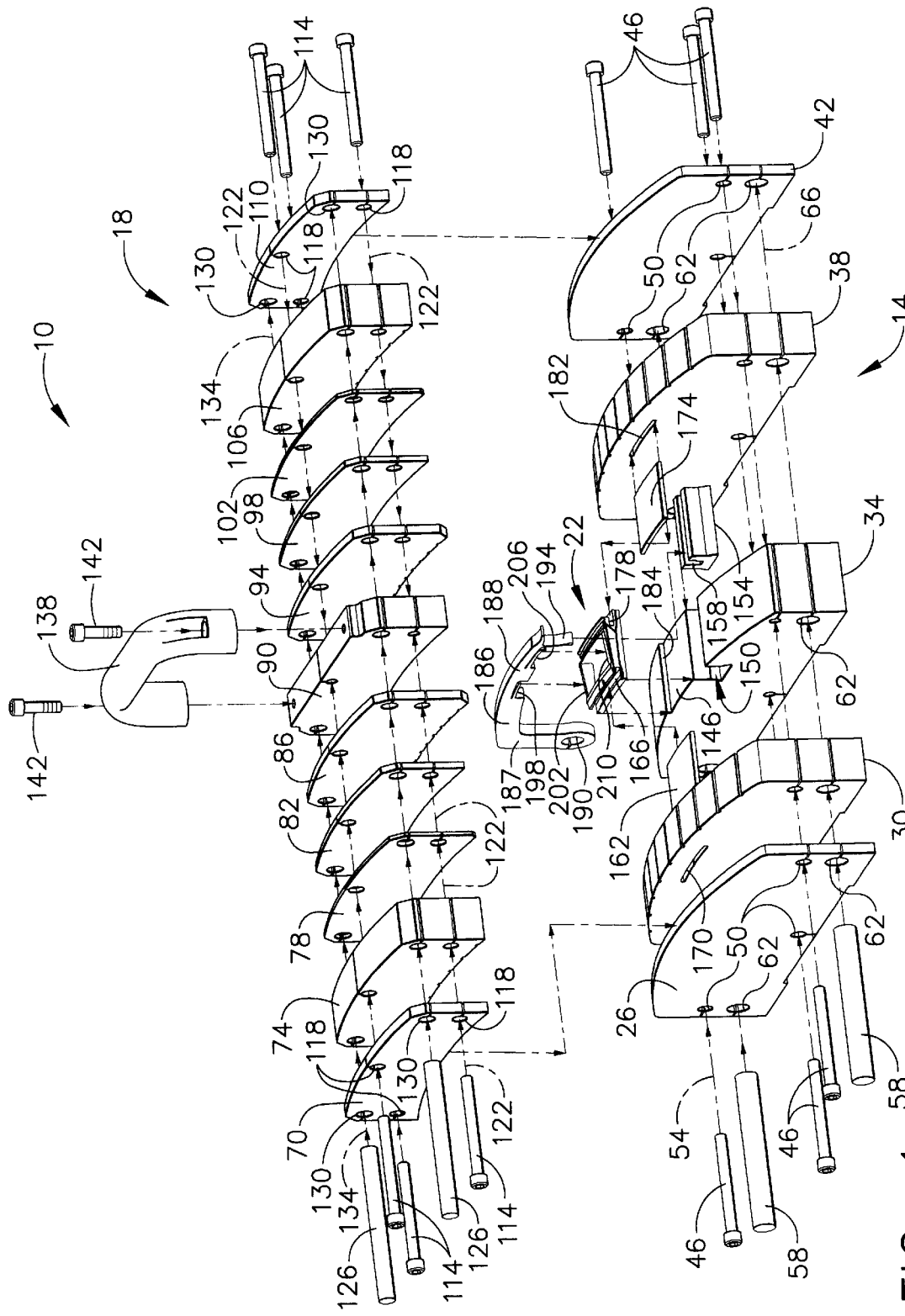
FIG. 1 is an exploded view of an embodiment of the shaping tool of the present invention that shows the workpiece to be shaped.

Referring to the drawings, FIG. 1 shows an embodiment of the shaping tool of the present invention indicated generally as 10. Tool 10 comprises a lower base member indicated generally as 14 and an upper shaping member indicated generally as 18 that is movable relative to base member 14. As also shown in FIG. 1, shaping tool 10 is used to shape a workpiece having at least two laterally spaced curved surfaces, such a shroud section of a gas turbine engine indicated generally as 22. While the following description of tool 10 of the present invention and the method of using tool 10 will be with reference to shroud sections 22, it should be understood that the present invention is useful with a wide variety of workpieces have a plurality of (i.e., at least two) laterally spaced curved surfaces that require shaping (or reshaping). In addition, tool 10 of the present invention is useful in shaping (or reshaping) workpieces made of metal (e.g., such as shroud section 22), wood, plastic or any other material or combination of materials that can be abraded to remove the excess or undesired material. Also, while shroud section 22 has a plurality of convex curved surfaces that are shaped by tool 10, it should be understood that tool 10, with appropriate modification, can be used to shape workpieces having a plurality of concave curved surfaces, or a combination of convex and concave curved surfaces.

As shown in FIGS. 1, 2, 3B, and 4, base member 14 is comprised of a plurality of components or elements, including, in the adjacent order indicated, a lower left outside cover plate 26, a lower left guide bearing block 30, a lower center block 34, a lower right guide bearing block 38, and a lower outside right cover plate 42. These elements are secured together in an assembled relationship to form base member 14 by a plurality of suitable fasteners, e.g., three pairs of bolts 46 as shown in FIG. 1, that are inserted through respective aligned bores or holes 50 in each of the elements, as shown by arrows 54. A plurality of suitable elongated alignment members, e.g., a pair of alignment pins 58 as shown in FIG. 1, are inserted through respective aligned bores or holes 62 in each of the elements, as shown by arrows 66, to maintain the elements in proper alignment relative to each other when secured together by bolts 46.

As shown in FIGS. 1, 2, 3A, and 4, shaping member 18 is also comprised of a plurality of components or elements, including, in the adjacent order indicated, an upper left outside cover plate 70, an upper left follower bearing block 74, an upper left guide plate 78, an upper left spacer plate 82, an upper left shaping element 86, an upper center block 90, an upper right shaping element 94, an upper right spacer plate 98, an upper right guide plate 102, an upper right follower bearing block 106 and an upper right outside cover plate 110. These elements are also secured together in an assembled relationship to form shaping member 18 by a plurality of suitable fasteners, e.g., three pairs of 114 bolts as shown in FIG. 1, that are inserted through respective aligned bores or holes 118 in each of the elements as shown by arrows 122. A plurality of suitable elongated alignment members, e.g., a pair of alignment pins 126 as shown in FIG. 1, are inserted through respective aligned bores or holes 130 in each of the elements, as shown by arrows 134, to maintain the elements in proper alignment relative to each other when secured together by bolts 114. A gripping member in the form of handle 138 for manually grasping shaping member 18 is attached or otherwise secured to the upper surface of center block 90 by suitable fasteners such as a pair of bolts 142. This handle 138 allows the user of tool 10 to manually move shaping member 18 relative to base member 14. However, in an alternative embodiment of tool 10, a mechanism could be provided for mechanically moving shaping member 18 relative to base member 14.

Figure 5:
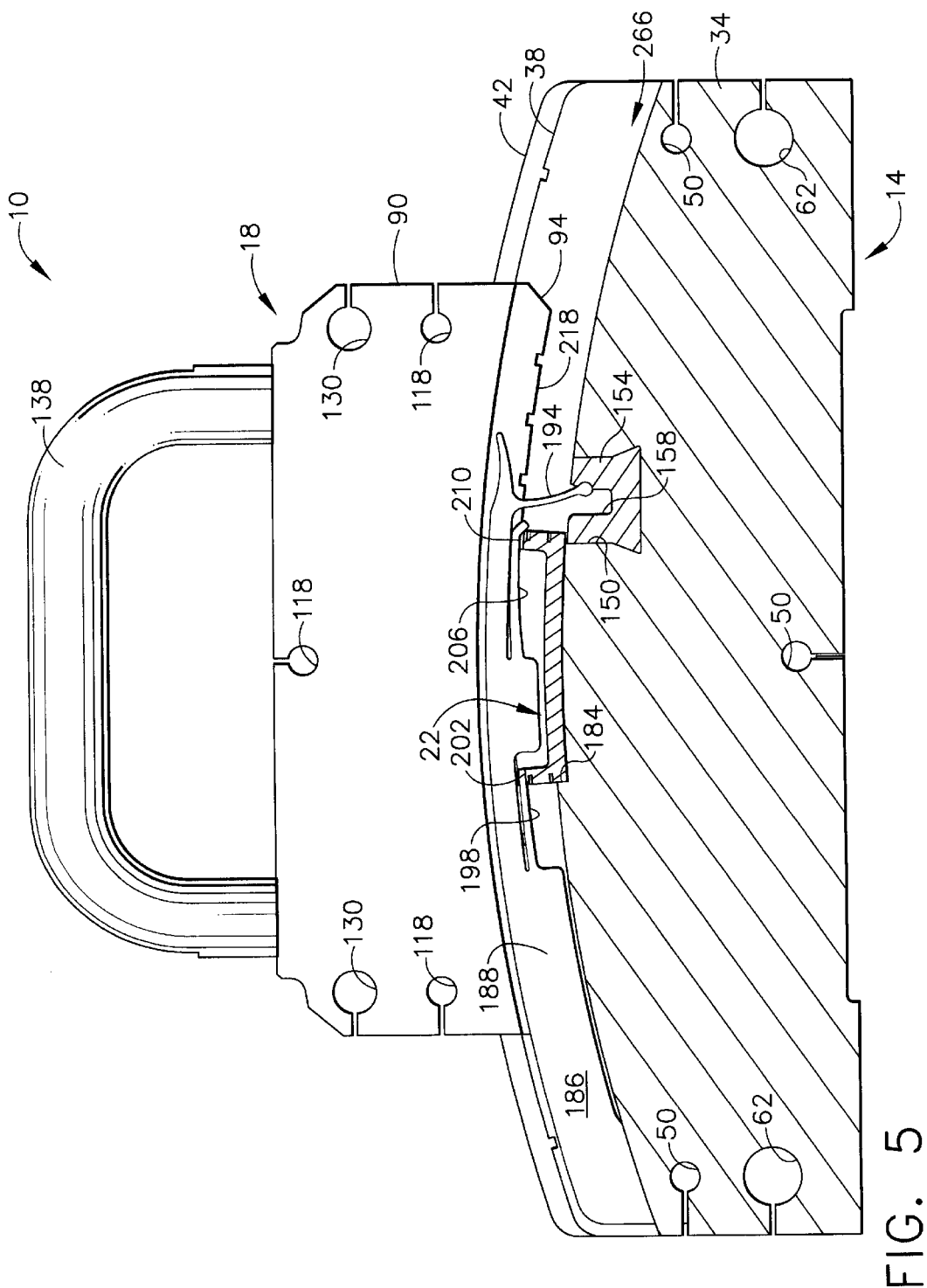
FIG. 5 is a sectional view along line 5—5 of FIG. 4.
Figure 6:
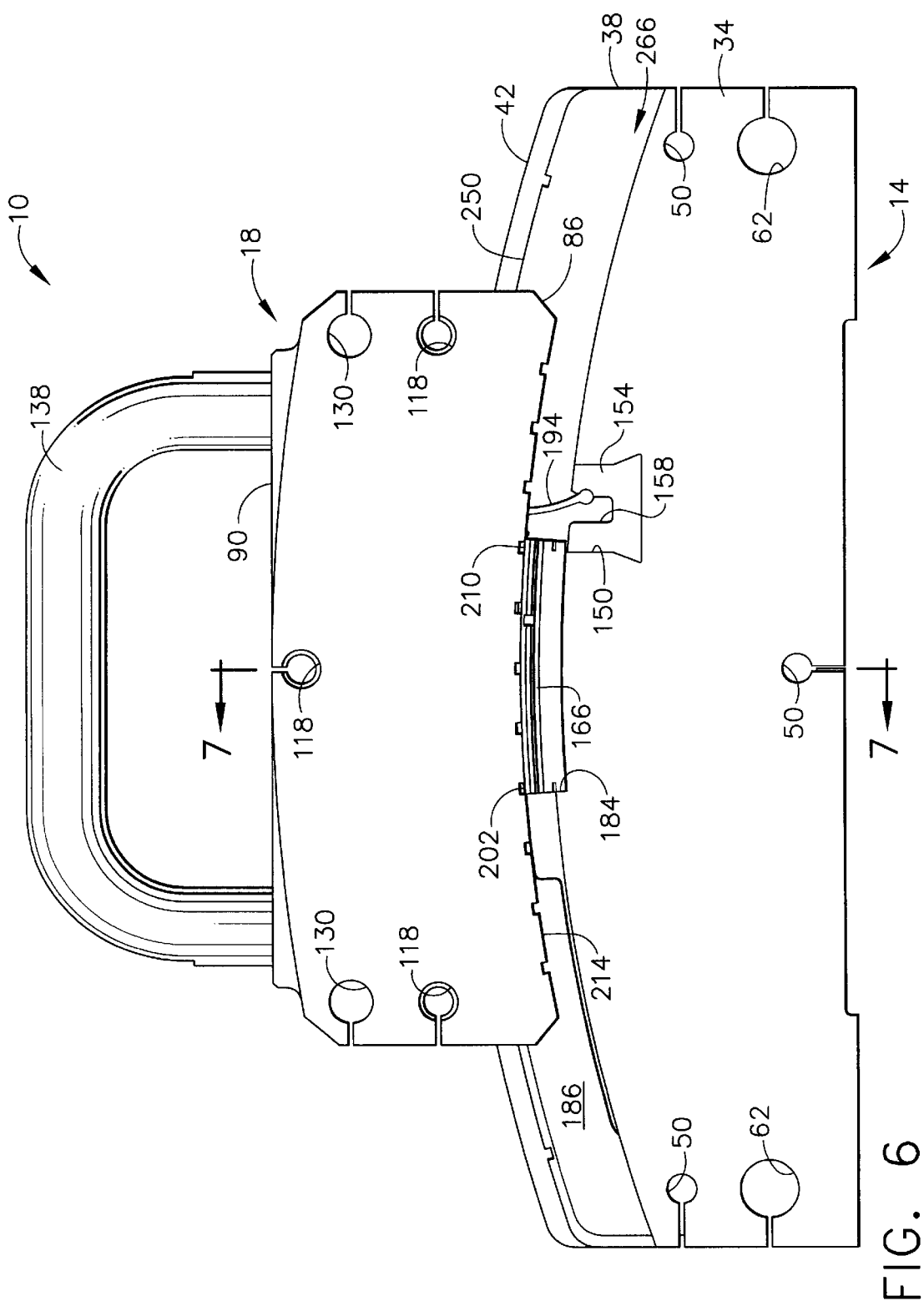
FIG. 6 is a sectional view along line 6—6 of FIG. 4.

As shown in FIG. 1, lower center block 34 has a generally square shaped recess indicated as 146 for receiving the base of shroud section 22. As shown in FIGS. 1, 5 and 6, lower center block 34 also has a configured or keyed recess 150 for receiving latch block 154 having an elongated recess or groove 158. A convex curved left workpiece support 162 is provided with one typically rounded edge that fits within and is slidably received by slot 166 of the fore rail of shroud section 22 to support and secure the fore rail end of shroud section 22. As shown in FIG. 1, the other edge of support 162 is press fit into a curved slot 170 formed in bearing block 30. A convex curved right workpiece support 174 is also provided with one typically rounded edge that fits within and is slidably received by slot 178 of the aft rail of shroud 22 to support and secure the aft rail end of shroud section 22. As shown in FIG. 1, one edge of support 174 is press fit into a curved slot 182 formed in bearing block 38. The shroud section 22 is typically secured to base 14 by sliding the fore and aft rails (via slots 166 and 178) onto respective supports 162 and 174 and against a stop in the form of shoulder 184 of recess 146. Typically, supports 162 and 174 keep the base of shroud section 22 slightly above the main surface of recess 146.

As shown in FIGS. 1, 3B, 5 and 6, tool 10 is also provided with a component in the form of a generally L-shaped clamp indicated as 186 for further releasably securing shroud section 22 in a relatively fixed and stationary position. Clamp 186 generally comprises a shorter arm 187 and a longer arm 188. Clamp 186 typically pivots about an axis defined by one of the alignment pins 58 that is inserted into a bore or hole 190 formed in arm 187. Arm 188 of clamp 186 includes a curved flexible tongue or latch 194 at one end thereof that fits into and is releasably secured by groove 158 of latch block 154 when clamp 186 is pivoted about to secure shroud section 22. Arm 188 of clamp 186 also has a resilient or flexible first spring tab indicated as 198 that contacts, and urges or biases against, the upper surface of one side rail indicated as 202 of shroud section 22 and a resilient or flexible second spring tab indicated as 206 that contacts, and urges or biases against, the upper surface of the other side rail indicated as 210 of shroud section 22. When clamp 186 is pivoted about to a secured position, i.e., when latch 194 is secured within groove 158 of latch block 154, shroud section 22 is kept in a relatively fixed and stationary position not only by left support 162 and right support 174, but also due to the biasing action of spring tabs 198 and 206 of clamp 186 against the upper surfaces of side rails 202 and 210.

Figure 2:
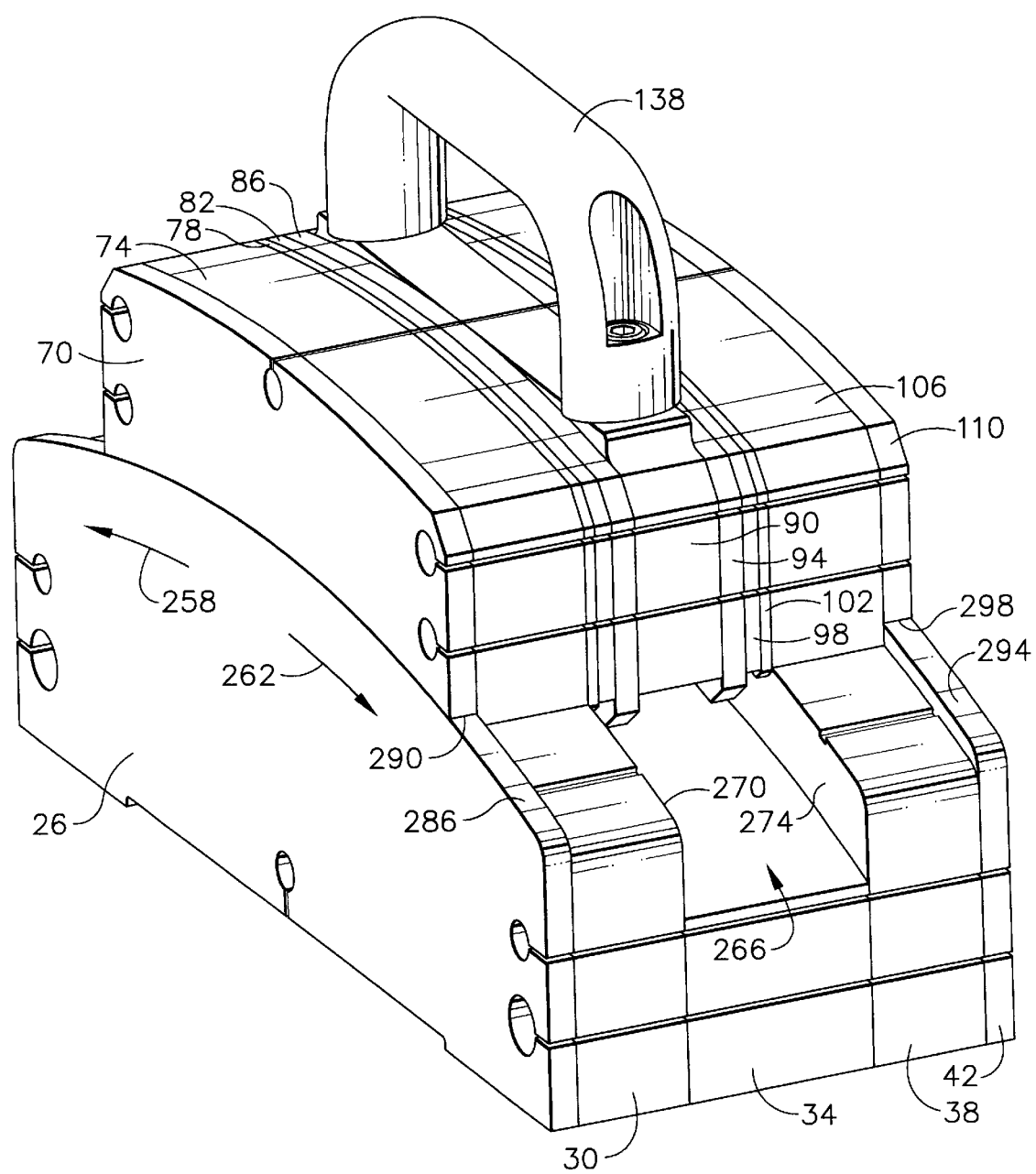
FIG. 2 an isometric front view of the shaping tool of FIG. 1.
Figure 3A:
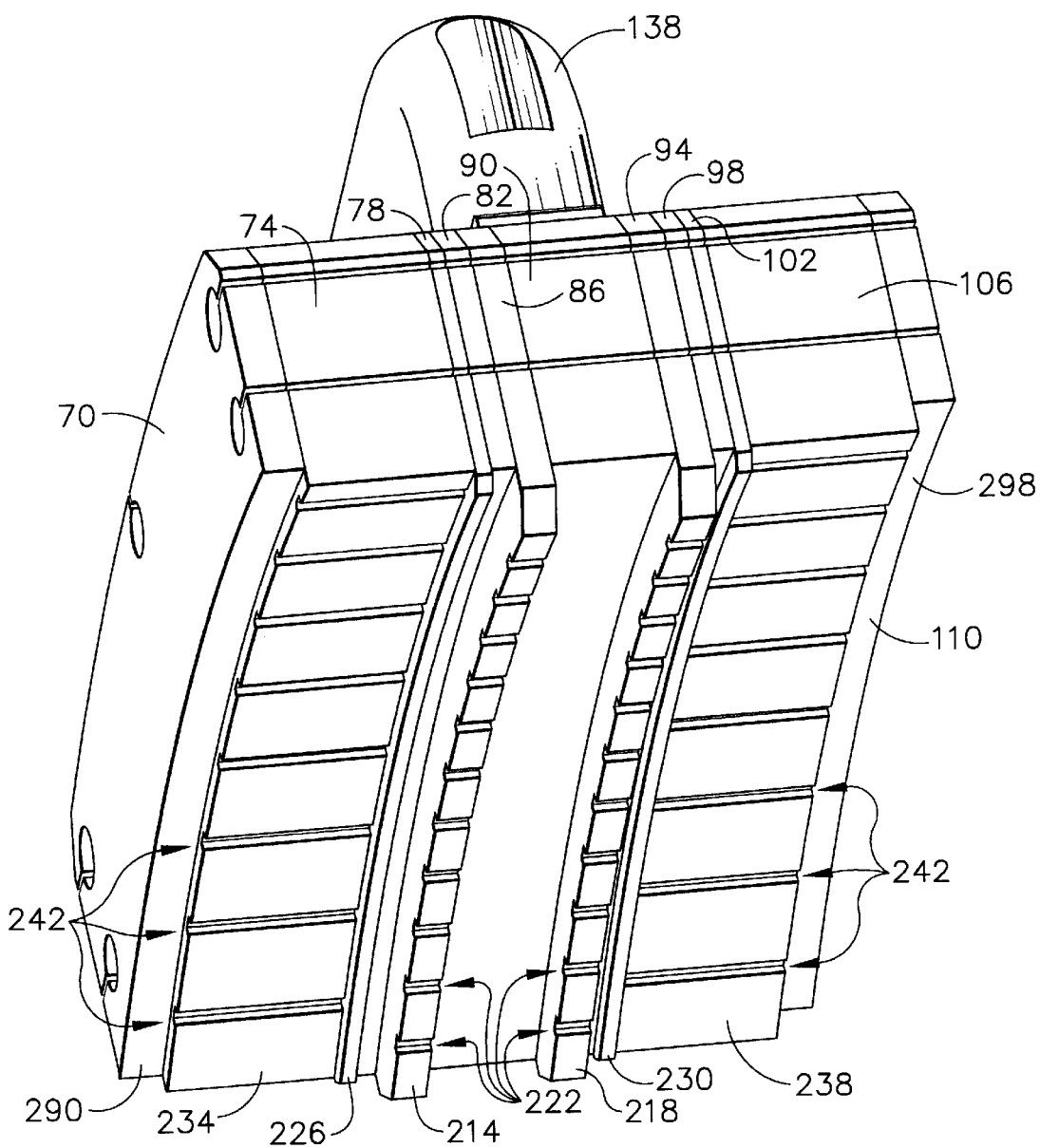
FIGS. 3A and 3B, together, are a view of the shaping tool of FIG. 2 in an open configuration showing the upper shaping member and the lower base member.
Figure 7:
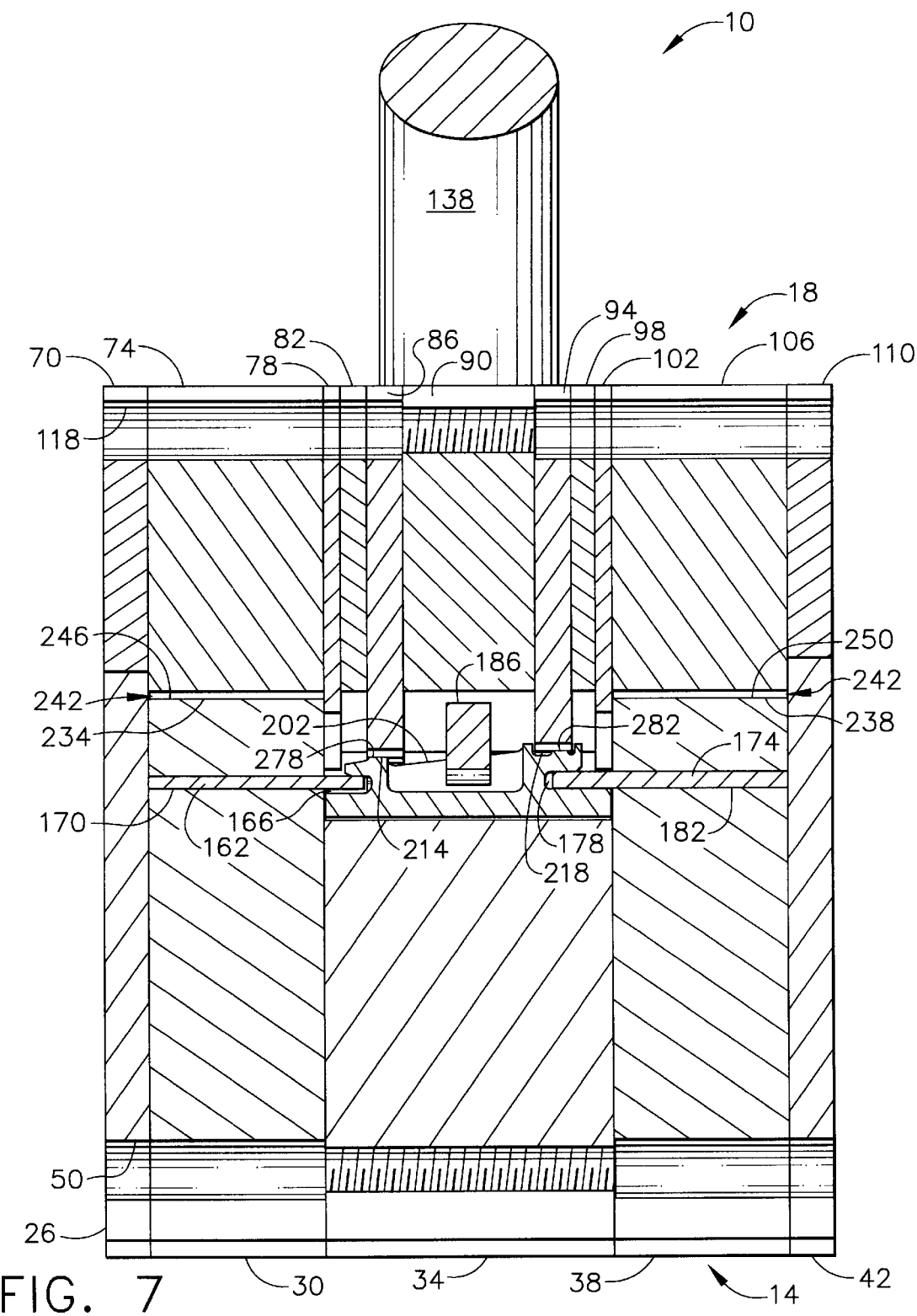
FIG. 7 is a sectional view along line 7—7 of FIG. 6.

Referring to FIGS. 2, 3A, and 7, the laterally spaced apart pair of shaping elements 86 and 94 each have respective lower concave curved abrading surfaces 214 and 218. These abrading surfaces 214 and 218 are typically coated with or have otherwise adhered thereto a suitable grit or abrasive material such as cubic boron nitride, diamond or silicon carbide. As shown in FIG. 3A, abrading surfaces 214 and 218 are provided with a plurality of laterally spaced recesses or grooves indicated by 222 (typically along the entire surface thereof as shown in FIG. 3A) that extend transversely and across shaping elements 86 and 94. These grooves 222 allow for the evacuation and removal of material abraded by the action of shaping elements 86 and 94. As also shown in FIG. 3A, the laterally spaced apart pair of guide plates 78 and 102 each have lower concave curved guide edges 226 and 230 that extend beyond the lower concave curved follower bearing surfaces 234 and 238 of the respective laterally spaced apart pair of upper follower bearing blocks 74 and 106. These follower bearing surfaces 234 and 238 are also provided with a plurality of laterally spaced recesses or grooves indicated as 242 (typically along the entire surface thereof as shown in FIG. 3A) that extend transversely and across bearing blocks 74 and 106. Like grooves 222, grooves 242 allow for the evacuation and removal of material abraded by the action of shaping elements 86 and 94.

Figure 3B:
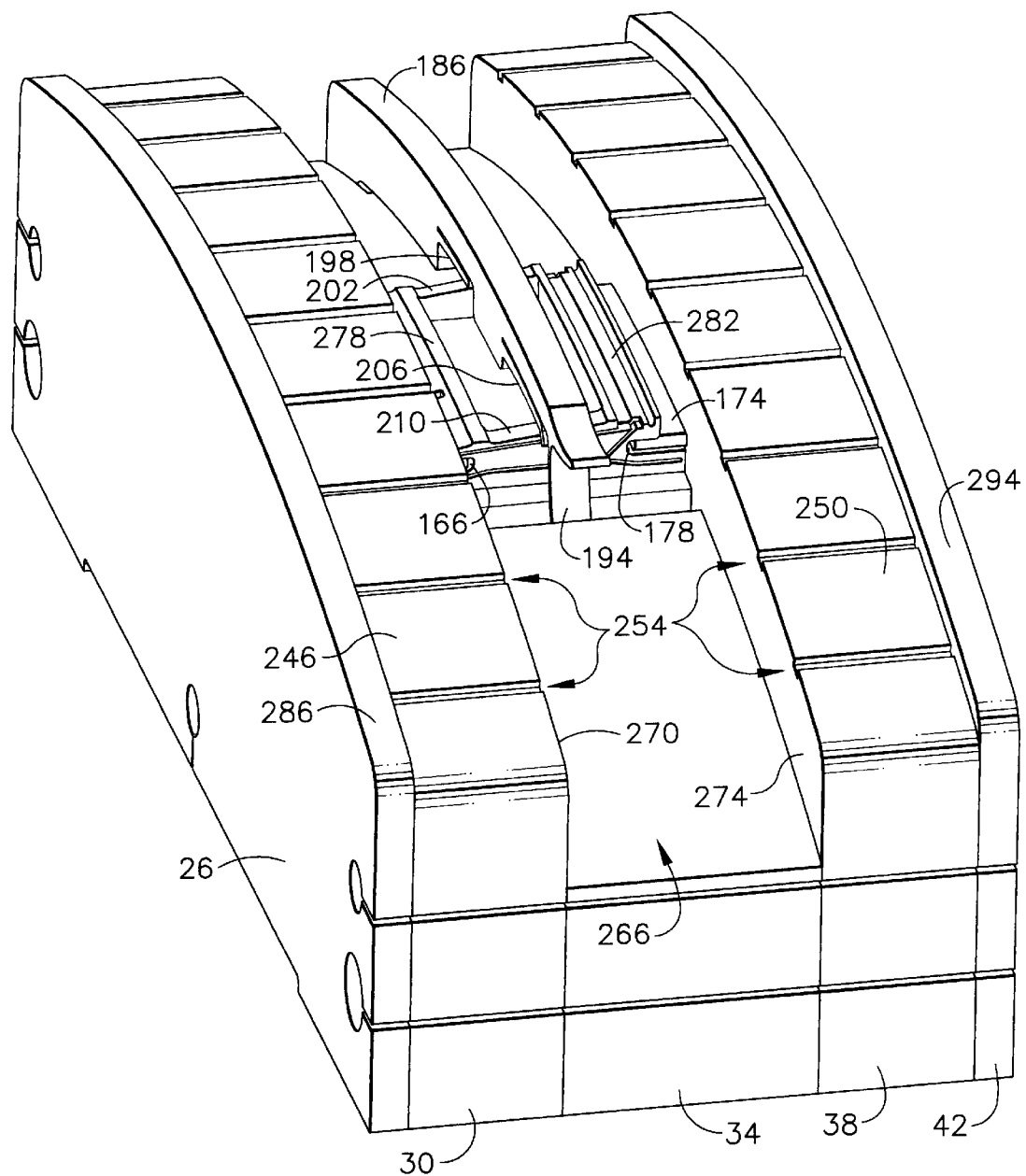
Figure 4:
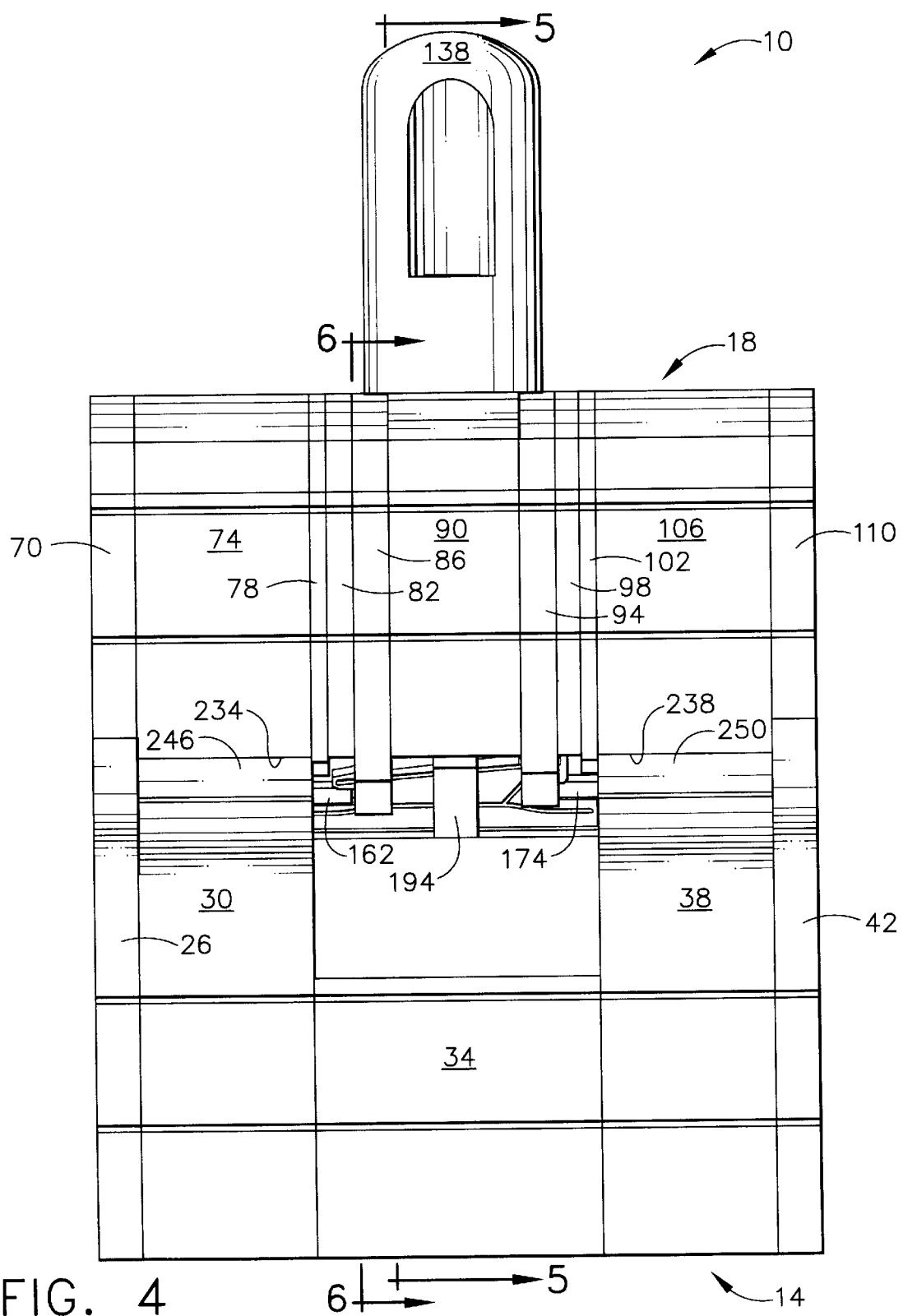
FIG. 4 is a front elevational view of the shaping tool of FIG. 2.

As shown in FIG. 3B, the laterally spaced apart pair of bearing blocks 30 and 38 have respective upper convex curved guide bearing surfaces 246 and 250. These guide bearing surfaces 246 and 250 are also provided with a plurality of laterally spaced recesses or grooves indicated as 254 (typically along the entire surface thereof as shown in FIG. 3B) that extend transversely and across bearing blocks 30 and 38. Like grooves 222 and 242, grooves 254 allow for the evacuation and removal of material abraded by the action of shaping elements 86 and 94. As shown in FIG. 2, follower bearing surfaces 234 and 238 are laterally spaced apart the same (or substantially the same) distance as, and cooperate with, respective guide bearing surfaces 246 and 250. As shaping member 18 is moved relative to base member 14 in either the forward direction as indicated by curved arrow 258, or the reverse or backward direction as indicated by curved arrow 262, follower bearing surfaces 234 and 238 of the pair of upper blocks 74 and 106 are in contact with, follow, slide along, and are guided by the respective guide bearing surfaces 246 and 250 of the pair of lower blocks 30 and 38. Guide edges 226 and 230 (of guide plates 78 and 102) that extend into the generally U-shaped central slot or channel 266 defined by lower blocks 30, 34 and 38 are laterally spaced apart such that they fit between the respective laterally spaced apart vertical sides 270 and 274 of the pair of blocks 30 and 38. As a result, guide plates 78 and 102 further guide shaping member 18 as it is moved in the forward (or backward) direction relative to base member 14, including minimizing or restricting lateral movement of shaping member 18 transverse or perpendicular to the forward or backward directions indicated by curved arrows 258 and 262. Guide plates 78 and 102 also serve to center the shaping member 18 relative to the base member 14.

As shown particularly in FIG. 3B, the fore rail of shroud section 22 has a horizontally extending convex curved upper surface 278, while the aft rail of shroud section 22 has a horizontally extending convex curved upper surface 282 that is laterally spaced apart from curved surface 278. Indeed, as shown in FIG. 7, shaping elements 86 and 94 are laterally spaced apart the same (or substantially the same) distance as surfaces 278 and 282 such that element 86 extends horizontally in the same (or substantially the same) vertical plane as surface 278 horizontally extends in, while element 94 extends horizontally in the same (or substantially the same) vertical plane as surface 282 horizontally extends in. As also particularly shown in FIG. 7, curved surface 278 lies on a horizontal curve plane that is latitudinally (i.e., vertically) spaced apart relative to the corresponding horizontal curve plane that curved surface 282 lies on, i.e., curved surface 278 does not lie on the same horizontal curve plane as curved surface 282, but is, instead, vertically lower than curved surface 282. Similarly, as also shown in FIG. 7, abrading surface 214 of shaping element 86 lies on a horizontal curve plane that is latitudinally spaced apart relative to the corresponding horizontal curve plane that abrading surface 218 of shaping element 94 lies on, i.e. the horizontal curve plane of abrading surface 214 is vertically lower than the horizontal curve plane of abrading surface 218. In addition, abrading surfaces 214 and 218 have corresponding and complementary curvatures relative to curved surfaces 278 and 282 so as to provide appropriate shaping of the respective curved surfaces 278 and 282 as shaping member 18 is moved (forward, backward or both) relative to base member 14. As a result, when shaping member 18 is moved relative to base member 14 in the forward direction indicated by arrow 258, the backward direction indicated by arrow 262 (or both directions), abrading surface 214 is able to appropriately shape corresponding curved surface 278 of shroud section 22, while at the same time abrading surface 218 is able to appropriately shape corresponding curved surface 282 of shroud section 22. In addition, the curvature of abrading surfaces 214 and 218 is typically flatter than that of surfaces 278 and 282 for ease of shaping.

The degree of curvature of follower bearing surfaces 234 and 238 (of upper bearing blocks 74 and 106) is typically complementary to the degree of curvature of guide bearing surfaces 246 and 250 (of lower bearing blocks 30 and 38). In addition, the center point of the radius of curvature of guide bearing surface 246 is the same (or substantially the same) as the center point of the final desired radius of curvature of curved surface 278 of shroud section 22, while the center point of the radius of curvature of guide bearing surface 250 is the same (or substantially the same) as the center point of the final desired radius of curvature of curved surface 282 of shroud section 22. As a result, as shaping member 18 is moved forward, backwards (or both) relative to base member 14, the degree to which shaping elements 86 and 94 can remove or abrade material from the upper surfaces 278 and 282 of shroud section 22 is controlled so as to achieve the final desired shape or configuration of surfaces 278 and 282. In particular, the degree of curvature of the respective bearing and abrading surfaces are typically selected such that, as the degree of contact between follower bearing surfaces 234 and 238 (of upper bearing blocks 74 and 106) and guide bearing surfaces 246 and 250 (of lower bearing blocks 30 and 38) becomes greater and greater, the degree of contact between abrading surfaces 214 and 218 (of shaping elements 86 and 94) and respective surfaces 278 and 282 of shroud section 22 becomes less and less. Indeed, the lack of contact between abrading surfaces 214 and 218 and surfaces 278 and 282 of shroud section 22 is typically the signal or indication that the desired degree of shaping of surfaces 278 and 282 has been achieved. In this way, shaping tool 10 automatically, reproducibly and repeatedly controls the desired degree of shaping of surfaces 278 and 282 of shroud section 22.

It should also be understood that surfaces 278 and 282 for different workpieces could also lie on the same (or substantially the same) curve plane. In such a case, the abrading surfaces 214 and 218 of shaping elements 86 and 94 would also lie on the same (or substantially the same) curve plane. In an alternative embodiment of shaping elements 86 and 94, abrading surfaces 214 and 218 could be respectively replaced by grinding wheels, or other abrading devices. In another alternative embodiment of tool 10, the upper follower bearing blocks 74 and 106 and lower guide bearing blocks 30 and 38 could be replaced by other cooperative combinations for controlling the movement of shaping member 18 (and especially shaping elements 86 and 94) through the desired path for shaping the curved surfaces of the workpiece, such as, for example, a component or element having a curved slot (as the guide member) within which moves a pin (as the follower member). However, it has been found that the use of upper follower bearing blocks 74 and 106, in combination with lower guide bearing blocks 30 and 38, provides a more stable configuration for ensuring that shaping member 18 (and especially shaping elements 86 and 94) moves in repeating or reproducible path relative to base member 14 in shaping the curved surfaces of the workpiece.

Because tool 10 is relatively easy to take apart and reassemble, shaping elements 86 and/or 94 can be readily replaced as abrading surfaces 214 and 218 become worn or wear out, or if elements 86 and/or 94 become broken or damaged. In addition, the particular configuration and elements of base member 14 and shaping member 18 can be altered or changed to permit the shaping of workpieces having different sizes and numbers of curved surfaces requiring shaping, as well as curved surfaces having different degrees of curvature, different curve plane positioning and the like. For example, tool 10 can be appropriately modified to shape and remove material from concave curved surfaces, such as, for example, the upper concave curved surfaces of the fore rail slot 166 and/or the aft rail slot 178 of shroud section 22.

In typical operation, the shroud section 22 is secured to base member 14 by using respective fore rail and aft rail slots 166 and 178 to slide shroud section onto the respective rounded edges of supports 162 and 174 such that the base of shroud section positioned against shoulder 184 and slightly above recess 146 of the base member 14. As shown particularly in FIG. 7, because supports 162 and 174 extend outwardly at different heights from blocks 30 and 38 (due to the different respective heights of fore rail and aft rail slots 166 and 178 of shroud section 22), shroud section 22 is positioned automatically in the appropriate and correct direction or orientation for shaping when secured to base member 14. Clamp 186 is then pivoted about to secure latch 194 in groove 158 of latch block 154 and thus urge spring tabs 198 and 206 against the upper surfaces of side rails 202 and 210. As a result, shroud section 22, and especially curved surfaces 278 and 282, are secured in a relatively fixed and stationary position for shaping.

The shaping member 18 is then positioned with respect to base member 14 so that guide edges 226 and 230 extend into channel 266, i.e., between sides 270 and 274, and center shaping member 18 relative to base member 14. This allows follower bearing surfaces 234 and 238 (of upper bearing blocks 74 and 106) to be cooperatively in contact with, follow, slide along and be guided by the respective guide bearing surfaces 246 and 250 (of lower bearing blocks 30 and 38). Typically, the curvature of the upper convex curved surface 286 of lower left cover plate 26 is complementary to the curvature of the corresponding lower concave curved surface 290 of upper left cover plate 70, while the curvature of the upper convex curved surface 294 of lower right cover plate 42 is complementary to the curvature of the corresponding the lower concave curved surface 298 of upper cover plate 110. In addition, because the radius of curvature of the corresponding curve combination of surfaces 286 and 290 is typically different from that of the corresponding curve combination of surfaces 294 and 298, shaping member 18 can be positioned relative to base member 14 only in the appropriate and correct direction or orientation for shaping curved surfaces 278 and 282 of shroud section 22.

After shaping member 18 is positioned in the correct configuration relative to base member 14, the user grips handle 138 to move shaping member 18 relative to base member 14 in the forward direction indicated by arrow 258, the backward direction indicated by arrow 262, or any of combination of forward and/or backward movements to achieve the desired degree of shaping of surfaces 278 and 282 of shroud section 22. Typically, the shaping member 18 is moved in a reciprocating fashion, motion or movement (i.e., a combination of forward and backward motions or movements) to achieve the desired degree of shaping the upper surfaces 278 and 282 of shroud section 22. In removing relatively small amounts of material (i.e., fractions of a mil) from surfaces 278 and 282, at least 1 and typically from 1 to 5 reciprocating movements is usually sufficient to achieve the desired degree of shaping. Typically, the amount of material removed from surfaces 278 and 282 to achieve the desired degree of shaping is in the range of from about 0.1 to about 0.9 mils (from about 0.0025 to about 0.023 mm), and more typically from about 0.1 to about 0.5 mils (from about 0.0025 to about 0.013 mm). The degree of contact between follower bearing surfaces 234 and 238 (of upper blocks 74 and 106) and guide bearing surfaces 246 and 250 (of lower blocks 30 and 38) is typically lower at the beginning of shaping, but becomes greater as more and more material is removed from surfaces 278 and 282 by the abrading action of shaping elements 86 and 94, and as surfaces 278 and 282 of shroud section begin to achieve the desired degree of shaping. The achievement of the desired degree of shaping is usually signaled or indicated by the lack of contact between abrading surfaces 214 and 218 of shaping elements 86 and 94 and the respective surfaces 278 and 282 of shroud section 22.

While specific embodiments of the method of the present invention have been described, it will be apparent to those skilled in the art that various modifications thereto can be made without departing from the spirit and scope of the present invention as defined in the appended claims.

What is claimed is:

1. A shaping tool for a workpiece having at least two laterally spaced curved surfaces, the shaping tool comprising:
   (a) a base member for securing the workpiece;
   (b) a shaping member movable relative to the base member and having one shaping element for each curved surface of the workpiece, each shaping element being laterally spaced and positioned relative to the respective curved surface to permit shaping of that curved surface as the shaping member is moved relative to the base member;
   (c) a guide member associated with one of the base member and the shaping member;
   (d) a follower member associated with the other of the base member and the shaping member;
   (e) the guide member and the follower member cooperating to guide the shaping member through a path as the shaping member is moved relative to the base member such that each of the shaping elements of the shaping member shape the respective curved surfaces of the workpiece.

2. The tool of claim 1 wherein the follower member comprises a laterally spaced pair of first and second lower curved bearing surfaces associated with the shaping member and wherein the guide member comprises a laterally spaced pair of first and second upper curved bearing surfaces associated with the base member, the first upper bearing surface cooperating with the first lower bearing surface and the second upper bearing surface cooperating with the second lower bearing surface.

3. The tool of claim 2 wherein each shaping element has a curved abrading surface.

4. The tool of claim 3 which comprises a pair of laterally spaced shaping elements.

5. The tool of claim 4 wherein the base member has a generally U-shaped central channel having laterally spaced apart vertical sides and wherein the shaping member has a pair of guide plates that are laterally spaced apart to fit within and extend into the channel.

6. The tool of claim 5 wherein the lower bearing surfaces have a concave curved shape and wherein the upper bearing surfaces have a convex curved shape and wherein the upper bearing surfaces have a degree of curvature that is complementary to the degree of curvature of the lower bearing surfaces to control the degree of shaping of the shaping elements.

7. The tool of claim 4 wherein the abrading surface of one of the shaping elements lies in a horizontal curve plane that is latitudinally spaced from the curve plane that the abrading surface of the other shaping element lies in.

8. The tool of claim 7 wherein the abrading surface of each shaping element has a concave curved shape.

9. The tool of claim 8 wherein the abrading surface of each shaping element has adhered thereto an abrasive material.

10. The tool of claim 1 wherein the shaping member can be positioned relative to the base member only in the appropriate orientation for shaping the curved surfaces of the workpiece.

11. A method for shaping the curved surfaces of a workpiece with a shaping tool, the shaping tool comprising a base member for securing the workpiece and a shaping member movable relative to the base member, the shaping member having one shaping element for each curved surface of the workpiece, each shaping element being laterally spaced and positioned relative to the respective curved surface to permit shaping of that curved surface as the shaping member is moved relative to the base member, the method comprising the steps of:
   (a) securing the workpiece to the base member;
   (b) positioning the shaping member relative to base member so that each shaping element of the shaping member can shape the respective curved surface of the workpiece; and
   (c) moving the shaping member in a path such that each of the shaping elements of the shaping member shape the respective curved surfaces of the workpiece until the desired degree of shaping of the curved surfaces of the workpiece is achieved.

12. The method of claim 11 wherein the step of moving the shaping member comprises at least 1 reciprocating movement.

13. The method of claim 12 wherein the step of moving the shaping member comprises from 1 to 5 reciprocating movements.

14. The method of claim 11 wherein the amount of material removed from the curved surfaces of the workpiece by the step of moving the shaping member is in the range of from about 0.1 to about 0.9 mils (from about 0.0025 to about 0.023 mm).

15. The method of claim 14 wherein the amount of material removed from the curved surfaces of the workpiece by the step of moving the shaping member is in the range of from about 0.1 to about 0.5 mils (from about 0.0025 to about 0.013 mm).

16. The method of claim 11 wherein the workpiece has a pair of laterally spaced convex curved surfaces.

17. The method of claim 16 wherein the workpiece is a gas turbine engine shroud section having a fore rail with a convex curved upper surface and an aft rail laterally spaced from the fore rail and having a convex curved upper surface.

18. The method of claim 11 wherein shaping member has a laterally spaced pair of first and second concave curved bearing surfaces and wherein the base member has a laterally spaced pair of first and second convex curved bearing surfaces, the first concave bearing surface cooperating with the first convex bearing surface and the second concave bearing surface cooperating with the second convex bearing surface.

19. The method of claim 18 wherein the convex bearing surfaces have a degree of curvature that is complementary to the degree of curvature of the concave bearing surfaces so as to control the degree of shaping by the shaping elements and to indicate when the desired degree of shaping of the curved surfaces of the workpiece has been achieved.

20. A shaping tool for shaping a pair of laterally spaced horizontally extending convex curved surfaces of a workpiece, the tool of comprising:
  (a) a lower base member having:
    (1) a lower center block for securing the workpiece; and
    (2) a pair of laterally spaced apart lower bearing blocks, each lower bearing block having an upper convex curved bearing surface;
  (b) an upper shaping member movable relative to the base member having:
    (1) a pair of shaping elements laterally spaced apart substantially the same distance that the curved surfaces of the workpiece are spaced apart, each shaping element having a lower concave curved abrading surface; and
    (2) a pair of upper bearing blocks laterally spaced apart substantially the same distance as the lower bearing blocks, each upper bearing block having a lower concave curved bearing surface;
  (c) wherein one of the upper bearing surfaces cooperates with one of the lower bearing surfaces and wherein the other of the upper bearing surfaces cooperates with the other of the lower bearing surfaces so that the shaping member is guided through a path as the shaping member is moved relative to the base member such that each of the shaping elements of the shaping member shape the respective curved surfaces of the workpiece.

21. The tool of claim 20 wherein the abrading surface of one of the shaping elements lies in a horizontal curve plane that is latitudinally spaced from the curve plane that the abrading surface of the other shaping element lies in.

22. The tool of claim 21 wherein the abrading surface of each shaping element has adhered thereto an abrasive material.

23. The tool of claim 21 which further comprises a pair of supports secured to the base member and wherein the workpiece has a pair of laterally spaced fore and aft slots, each support having an edge that is slidably received by one of the slots of the workpiece for securing the workpiece to the center block.

24. The tool of claim 20 wherein the base member has a generally U-shaped central channel having laterally spaced apart vertical sides defined by the lower bearing blocks, and wherein the shaping member has a pair of guide plates, each guide plate having a lower guide edge, the lower guide edges being laterally spaced apart so as to extend into the channel and fit between the vertical sides thereof so as to center the shaping member relative to the base member.

25. The tool of claim 24 wherein shaping member further comprises a left and tight upper outside cover plate, each having a lower concave curved surface, and wherein the base member further comprises a left and right lower outside cover plate, each having an upper convex curved surface, and wherein the radius of curvature of the concave curved surfaces of the left and right upper outside plates relative to the radius curvature of the convex curved surfaces of the left and right lower outside plates is such that the shaping member can be positioned relative to the base member only in the appropriate orientation for shaping the curved surfaces of the workpiece.

26. The tool of claim 20 wherein the abrading surfaces and the bearing surfaces each have a plurality of a laterally spaced grooves that extend transversely and across the respective shaping elements and the respective bearing blocks.

* * * * *

UNITED STATES PATENT AND TRADEMARK OFFICE
CERTIFICATE OF CORRECTION

PATENT NO. : 6,679,757 B2
DATED : November 4, 2003
INVENTOR(S) : Willem Thomas Degraaff and Jae Yong Um It is certified that error appears in the above-identified patent and that said Letters Patent is hereby corrected as shown below:

Column 12,
Line 18, after the words "comprises a left and" and before the words "upper outside cover plate", the word "right" should be inserted and the word "tight" should be deleted.

Signed and Sealed this

First Day of June, 2004

JON W. DUDAS
*Acting Director of the United States Patent and Trademark Office*